(12) United States Patent
Zimmermann

(10) Patent No.: US 7,976,174 B2
(45) Date of Patent: Jul. 12, 2011

(54) METHOD AND APPARATUS FOR PROJECTING AN OPTICAL PROJECTION ONTO A PROJECTION SURFACE

(75) Inventor: Kurt-Michael Zimmermann, Freiburg (DE)

(73) Assignee: Z-Laser Optoelektronik GmbH, Freiburg (DE)

( * ) Notice: Subject to any disclaimer, the term of this patent is extended or adjusted under 35 U.S.C. 154(b) by 757 days.

(21) Appl. No.: 12/035,193

(22) Filed: Feb. 21, 2008

(65) Prior Publication Data

US 2008/0204664 A1 Aug. 28, 2008

(30) Foreign Application Priority Data

Feb. 26, 2007 (DE) .......................... 10 2007 009 579

(51) Int. Cl.
*G03B 21/00* (2006.01)
*A61B 18/18* (2006.01)
*B23K 26/00* (2006.01)

(52) U.S. Cl. .......................... 353/121; 606/5; 219/121.64

(58) Field of Classification Search .................... 353/28, 353/30, 31, 37, 38, 70, 48–51, 68, 76, 81, 353/101, 121; 359/454, 457, 458, 285, 311, 359/326, 328, 385, 388; 250/216, 208.1, 250/458.1; 606/1, 4, 5, 9, 108; 219/121.64, 219/121.78, 121.83

See application file for complete search history.

(56) References Cited

U.S. PATENT DOCUMENTS

| 4,924,063 | A | * | 5/1990 | Buchel et al. | ............ 219/121.64 |
| 6,002,505 | A | | 12/1999 | Kraenert et al. | |
| 2001/0005262 | A1 | | 6/2001 | Tsurushima | |

FOREIGN PATENT DOCUMENTS

| EP | 1513008 A1 | 9/2005 |
| JP | 04111585 A | 4/1992 |
| JP | 05008556 | 5/1993 |
| JP | 2002006397 A | 1/2002 |
| JP | 2002196301 A | 7/2002 |
| JP | 2002196415 A | 7/2002 |
| JP | 2002196416 A | 7/2002 |

* cited by examiner

*Primary Examiner* — Georgia Y Epps
*Assistant Examiner* — Don Williams
(74) *Attorney, Agent, or Firm* — The Webb Law Firm

(57) ABSTRACT

In a method for projecting at least one optical projection onto at least one projection surface a monitoring zone that contains and/or surrounds a first projection surface is scanned with the aid of a working laser beam, which is not hazardous for the human eye, by the positioning the working laser beam on various scanning positions located in the monitoring zone, and a measured signal for light from the working laser beam that is reflected from the scanning positions is acquired. The measured signal is compared with the reference signal. Depending on the result of this comparison, the optical projection is projected onto the first projection surface by means of a projection laser beam, which has a greater radiant power than the working laser beam. With the aid of the working laser beam, a second optical projection is projected onto a second projection surface that is located outside of the monitoring zone.

11 Claims, 4 Drawing Sheets

Figure 1:
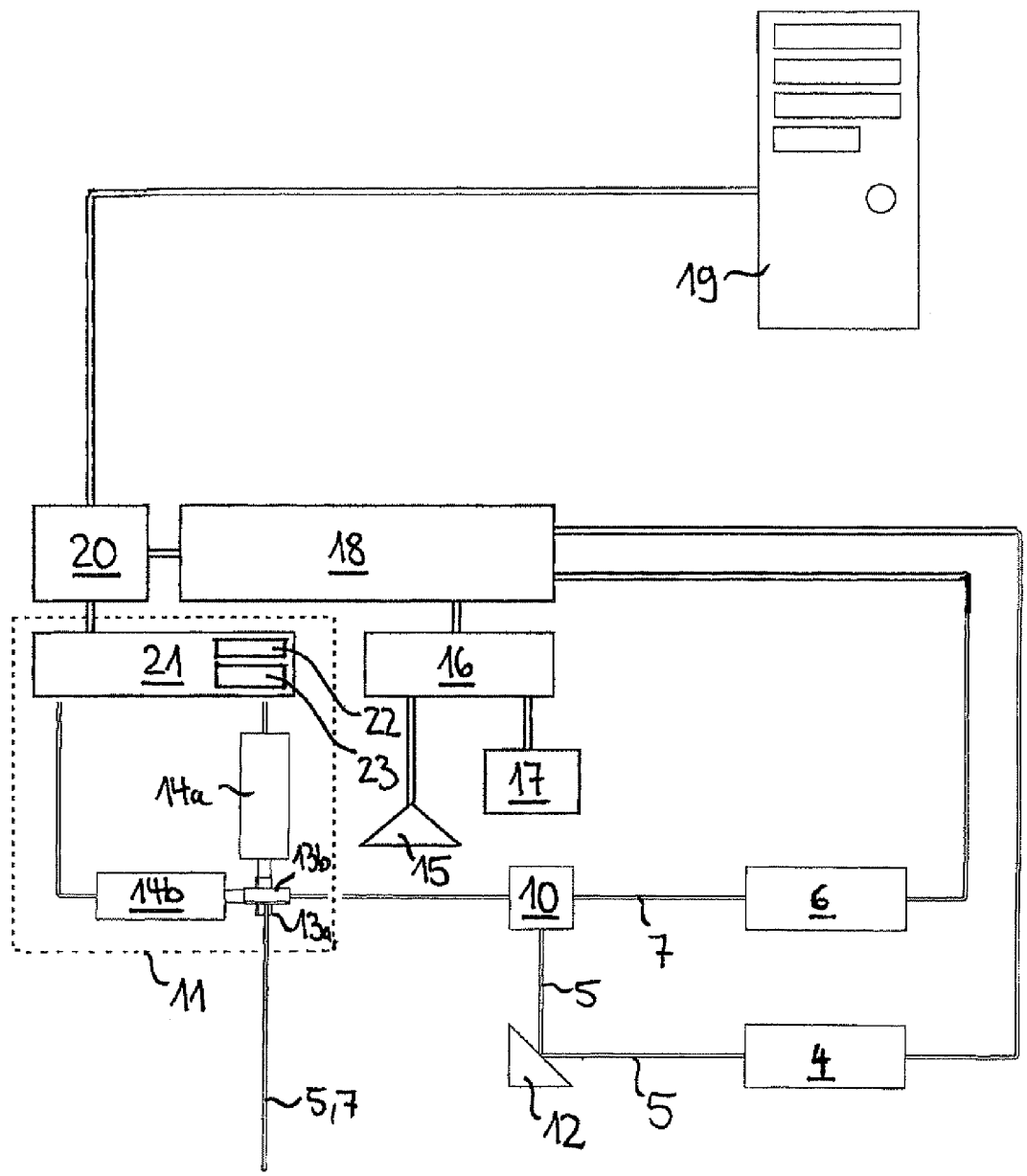

METHOD AND APPARATUS FOR PROJECTING AN OPTICAL PROJECTION ONTO A PROJECTION SURFACE

The invention relates to a method and apparatus for projecting at least one optical projection onto at least one projection surface.

An apparatus of this type for projecting a two-dimensional optical projection is known from US 2001/0005262 A1. It has a first laser for generating a working laser beam that is not hazardous to the human eye, and it has a second laser for generating a projection laser beam that has a greater radiant power than the working laser beam. The projection laser beam may be positioned with the aid of a positioning device on various positions of a projection surface disposed on a projection screen. The working laser beam may be positioned at various positions on a monitoring zone that extends around the periphery of the projection surface. A measuring device is provided in order to acquire a measured signal for the working laser beam light that is reflected from the monitoring zone. In order to compare the measured signal with at least one reference signal, the measuring device is connected to a comparison device. The comparison device communicates by means of a control connection to a releasing device for the second laser in such a way that the optical projection may be projected onto the projection surface by means of the projection laser beam when the releasing device releases the projection laser beam. If a person is present in the monitoring zone, the measured signal deviates from the reference signal, and the projection laser beam is disabled. This eliminates the risk that this person's eyes can be injured by the projection laser beam. However, the apparatus has the disadvantage that it is relatively difficult to use.

The object of the invention is therefore to provide an apparatus and a method of the type referred to above that allows the system to be used better.

This object is accomplished with respect to the method by means of the elements of claim 1.

In this method the monitoring zone is first surveyed with the aid of the working laser beam, which is not hazardous to the human eye. Here, the radiant power and the positioning speed of the working laser beam are preferably selected in such a way that the mean power density of the working laser beam relative to a 7 mm aperture does not exceed the limit value specified for laser class 2M (European Union) or 3A (United States of America). The resulting measured signal is compared with the reference signal and the projection laser beam that is hazardous to the human eye is not generated or transmitted until the measured signal sufficiently matches the reference signal, thereby ensuring that a projection object having the first projection surface, for example a projection screen and/or a wall of a building, is located in the monitoring zone, and, moreover, ensuring that no persons are present in the monitoring zone. In addition to the first projection surface, a second projection surface that is located outside of the monitoring area, for example on the projection object and/or on an additional projection object, is provided. With the aid of the working laser beam, a second optical projection is projected onto the second projection surface if the working laser beam is not currently needed to check the monitoring zone. In an advantageous manner, the working laser beam may then be used in a twofold manner, namely on the one hand for scanning the monitoring zone and on the other hand for projecting the second optical projection. The second projection surface may be located on the same projection object as the first projection surface and/or on at least one additional projection object. For example, the second projection surface may be provided on the floor of an exhibition hall and optically marked at locations at which objects such as exhibition booths are to be located. Since the radiant power of the working laser beam is not hazardous to the human eye, no particular safety precautions need to be taken when projecting the second optical projections.

In a preferred embodiment of the invention the working laser beam and the projection laser beam are generated with the aid of different lasers. In this case, the laser that is used to generate the working laser beam preferably has a lower rated radiant power than the laser provided for the projection laser beam. The operating time, and hence the wear and tear, on the relatively expensive laser that has the greater rated radiant power are then reduced accordingly.

In a different embodiment of the invention, the working laser beam is generated by attenuating the projection laser beam. This eliminates the need to provide a second laser to generate the working laser beam.

The apparatus may have an electronic modulation device for the second laser. Here too, it is possible to generate the projection laser beam as well as the working laser beam with the aid of a single laser.

In an advantageous embodiment a projection object having the first projection surface and a projection device provided to emit the working laser beam are placed in a predetermined set position relative to each other, in which case the projection object is then scanned at the scanning points in the monitoring zone with the aid of the working laser beam, and at least one measured signal for the working laser beam light reflected from the scanning points is acquired, and this measured signal is stored as a reference signal. The reference signal may therefore be measured in a simple manner. Is even possible to repeatedly scan the monitoring zone, to acquire a measured signal upon each scan, to filter the measured signals, and to save the filtered measured signal as a reference signal. Upon filtering, in particular the mean value can be generated from a plurality of measured signals in order to compensate for noise or similar measurement errors. It is also possible to determine characteristic values from the measured signal and to store these values as a reference signal. The working laser beam may also be modulated with the aid of a modulation device in such a way that it can be differentiated from interference signals.

In an advantageous manner the working laser beam is deflected so that it can be positioned on the projection surfaces and/or the projection laser beam is deflected so that it can be positioned on the first projection surface. A deflection system of this type may be implemented in a simple manner with the aid of at least one pivoting deflection mirror, an acoustico-optical modulator, and/or some other suitable deflection device.

It is advantageous for the scanning locations to be disposed on an area of the projection object that surrounds the first projection surface. The correct position of the projection object and, therefore, the projection surface may then be checked even faster.

In a preferred embodiment of the invention, the scanning of the projection object takes place while the projection laser beam is projected onto the projection surface. In this case, an area of the projection object that surrounds the optical projection preferably is scanned with the aid of the working laser beam, for example by having the working laser beam scan around the optical projection generated with the aid of the projection laser.

A method in which the working laser beam and the projection laser beam are guided in the same track across the first projection surface with the working laser beam travelling in front of the projection laser beam is advantageous. In this case the distance between the working laser beam [and] the projection laser beam preferably is selected to be sufficiently large so that, when an impermissibly large deviation between the measured signal and the reference signal occurs, the projection laser beam is shut off before it reaches the position at which the deviation between the measured signal and the reference signal has occurred.

It is advantageous when at least two first projection surfaces are adjacent to each other, when for each of these projection surfaces in each case one projection laser beam is generated, when the first optical projection extends across at least two of the first projection surfaces, when the first optical projection is divided into projection zones that are each disposed within a first projection surface, and when the individual projection zones are projected onto said projection surface with the projection laser beam that is assigned to the respective projection surface. In this way optical projections of nearly any size can be projected safely and with great precision onto a projection surface.

In a preferred embodiment of the invention, the monitoring zone is divided into subzones, and for each subzone one working laser beam is generated, and the individual subzones are each scanned with the working laser beam that is assigned to them. In this way monitoring zones of nearly any size can be monitored reliably with a plurality of working laser beams.

The object referred to above is accomplished with respect to the apparatus by the elements of claim 11: The projection laser beam, which is hazardous to the human eye, is not released by the releasing device unless the measured signal essentially corresponds to the reference signal and it is thereby ensured that a projection object having the first projection surface is located in a predetermined position relative to the projection device. In advantageous manner, the predetermined position of the projection object relative to the projection device and the spatial segment into which the projection laser can be projected, is defined, for example by a person responsible for laser safety, when the apparatus is first put into operation in such a way that no persons can be located in the area in which the projection laser projects its beam, for example because the area into which the beam is projected is located at a sufficient height above the ground or floor. When the apparatus is first put into use, the reference signal may be acquired with the aid of the measurement device and stored in a nonvolatile data storage device, for example an EEPROM or a computer hard disk. After the initial startup is completed and the apparatus has been checked to make certain that it is operating properly, the apparatus may safely be operated unattended. The projection device and the projection surface may be located at a relatively large distance from each other, for example at a distance of from 20 to 50 m. If the position of the projection surface, which may be a projection screen for example, changes relative to the projection device, the projection laser beam will be disabled. In an advantageous manner, the working laser beam, which is not hazardous to the human eye, and the apparatus components needed to deflect this beam can then also be used for optical projection if no projection is generated using the more powerful projection laser beam.

In a preferred embodiment of the invention, the projection device has separate lasers of different radiated power for generating the working laser beam and for generating the projection laser beam, and the positioning device is located in the path of the beams from both lasers. This can be accomplished if both laser beams are directed to the positioning device by means of the same prism. In this way, the positioning device may optionally or alternately be used for the one or the other laser.

It is advantageous if the first projection surface is surrounded by a boundary strip that is reflective to the working laser beam and is located in the monitoring zone and/or if the first projection surface itself has such a boundary strip. If the first projection surface is scanned with the aid of the working laser beam, this beam is reflected to a greater extent at the boundary of the first projection surface than is the case at the other locations on the first projection surface. With the aid of the measured signal for the radiation reflected back from the working laser beam and the known spatial position of the working laser beam, the position of the boundary strip and, hence, that of the first projection surface relative to the projection device can be determined. Of course, it is also possible for the entire first projection surface to be reflective for the working laser beam.

It is advantageous if the first projection surface is formed by the surface of a film that preferably is transparent in some areas. This film may, for example, be suspended from the ceiling of a building, for example in an exhibition hall, in a convention building, in a theatre, or in a covered pedestrian zone. The film preferably extends in an essentially horizontal or vertical plane.

In a preferred embodiment of the invention, the apparatus has a number of devices consisting of the least of the projection device, the positioning device, the measuring device, the comparison device, and the releasing device, and said devices are assigned to various subzones of the projection surface. The optical projection may then be comprised of a plurality of subprojections, with each subprojection being projected by a separate projection device. The individual projection devices are preferably spaced apart from each other. In particular a plurality of protection devices may be disposed in a matrix-like pattern in a row or in a plurality of rows running adjacent to reach other in order to be able to project the optical projection onto a correspondingly large projection surface with high accuracy.

Figure 2:
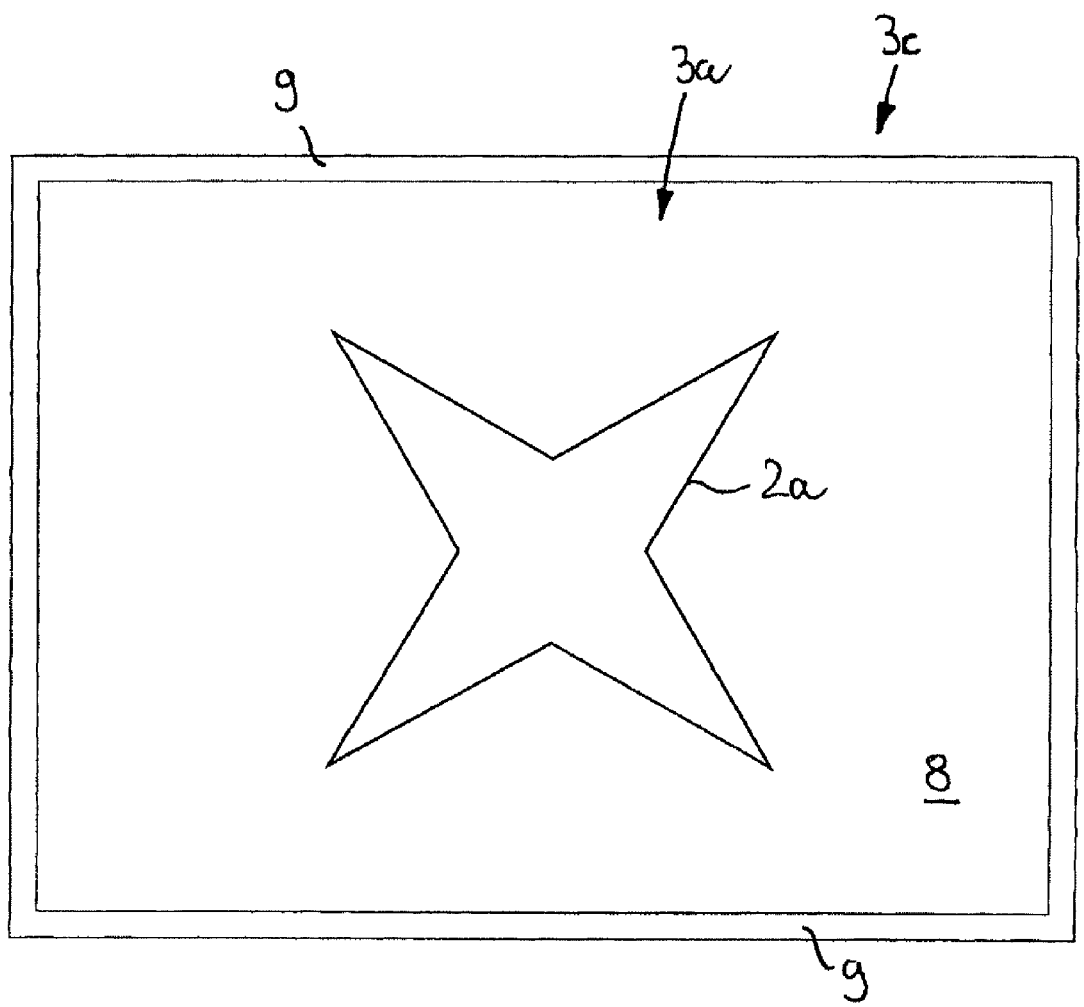
Figure 3:
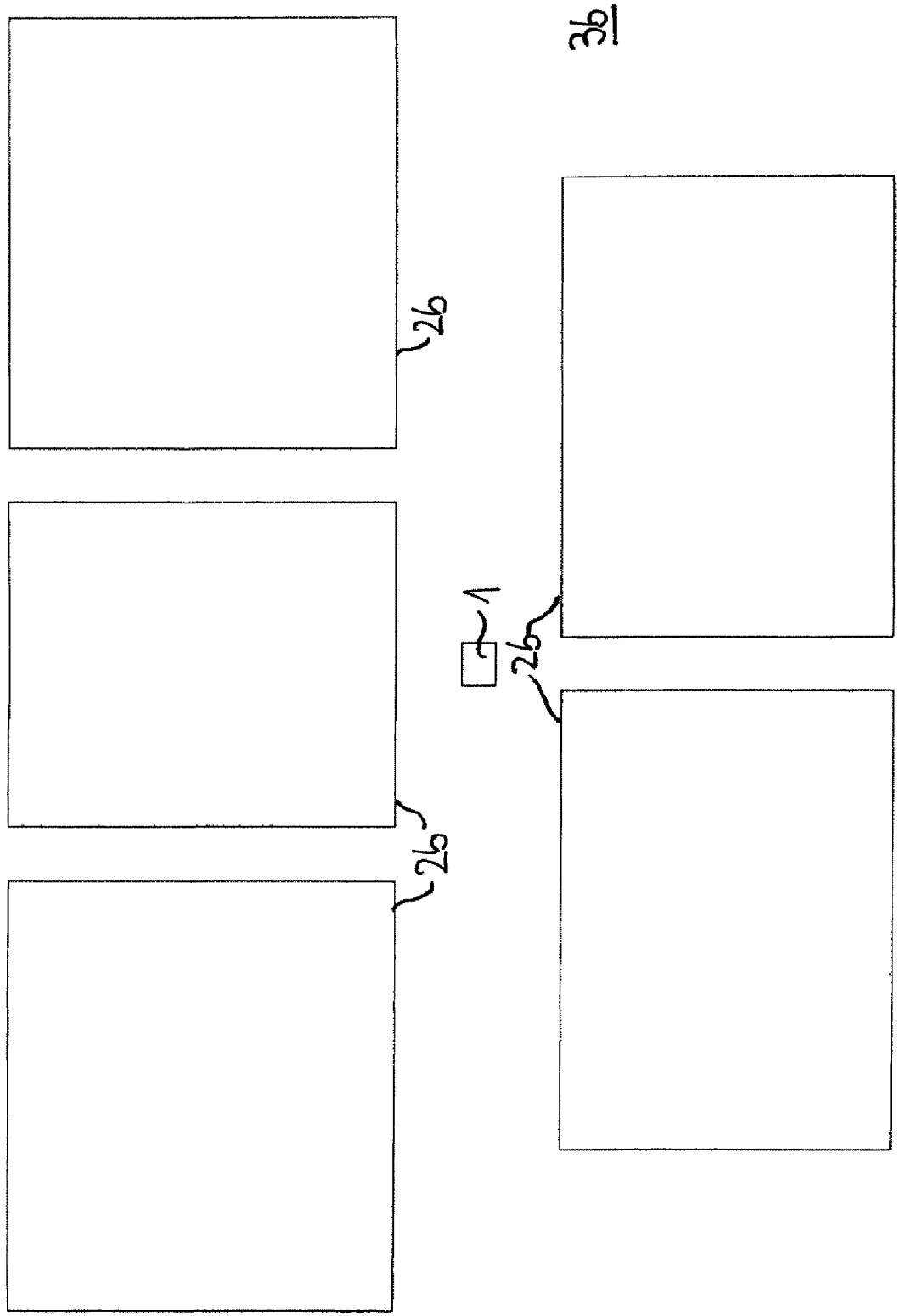
Figure 4:
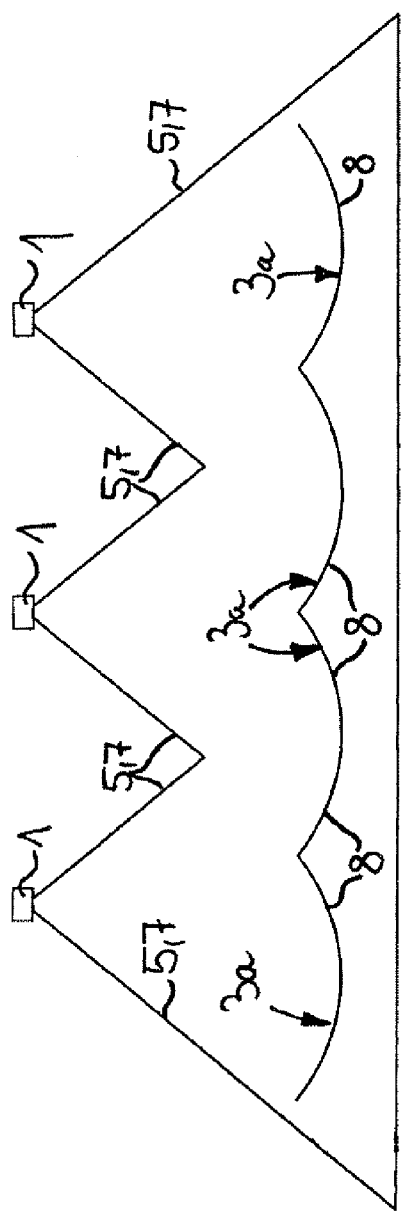
Figure 5:
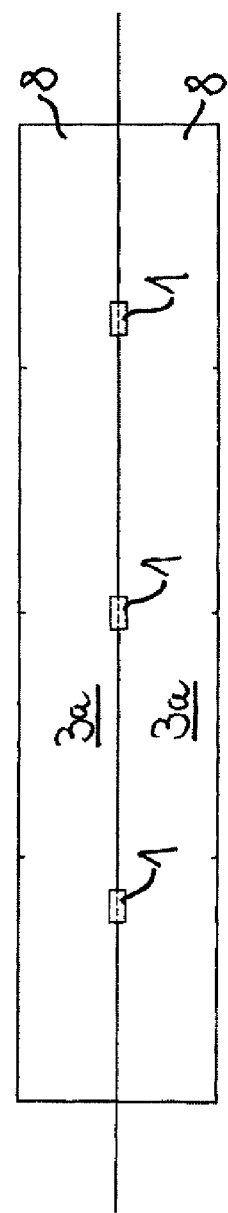

The embodiment examples of the invention are explained in greater detail below based on the drawing. The drawing shows:

FIG. 1 a schematic diagram of an apparatus for projecting an optical projection onto a projection surface, FIG. 2 a reflective film that serves as a projection surface and on which the apparatus is disposed, FIG. 3 a device that projects optical markings onto the floor of a hall, FIG. 4 a side view of a plurality of projectors that are arranged adjacent to each other and that project an optical image onto an awning, and FIG. 5 a top view onto the devices and the awning.

An apparatus that is identified as a whole with 1 in FIG. 1 for projecting optical projections 2a, 2b onto a first projection surface 3a and a second projection surface 3b has a first laser 4 for generating a working laser beam 5 and a second laser 6 for generating a projection laser beam 7.

In FIG. 2 it can be seen that the first projection surface 3a is formed by the surface of a projection object, such as a film 8, whose surface essentially extends in a vertical plane. The film 8 can, for example, be suspended from cords, ropes, or cables from the ceiling of a building. The first projection surface 3a is surrounded by a boundary strip 9 that reflects the working laser beam better than the central area of the first projection surface 3a that is surrounded by the boundary strip 9. The boundary strip is located in a monitoring zone 3c that has and/or surrounds the first projection surface 3a. The second projection surface 3b is located on the floor of a hall (FIG. 3), which is located below the first projection surface 3a.

A prism 10 is located in the path of the working laser beam 5 and of the projection laser beam 7. By means of this prism 10, the working laser beam 5 or optionally or alternatively the projection laser beam 7 may be directed to a positioning device 11. An optical deflection system, which directs the working laser beam coming from the first laser 5 to the prism 10, is provided in a fixed location between the first laser 4 and the prism 10.

The positioning device 11 has two deflection mirrors 13a, 13b that are mounted so that they can be pivoted about axes that extend perpendicularly to each other. Each deflection mirror 13a, 13b can be positioned in various pivot positions by means of a positioning drive 14a, 14b. With the aid of the positioning device 11 the working laser beam 5 may be freely positioned on both projection surfaces 3a, 3b, and the projection laser beam 7 may be freely positioned on the second projection surface 3b.

The first laser 4 is classified as laser class 2M (EU) or 3A (USA). In other words, the mean power density of the working laser beam 5 relative to a 7 mm aperture corresponding to the pupil of the human eye is so low that the human eye is not damaged if the working laser beam 5 passes through the iris and strikes the retina. The rated radiant power of the working laser beam 5 is preferably adapted to the maximum permissible laser power that is not hazardous to the eye, for example 5 mW (laser class 2M or 3A, respectively).

The second laser 6 is provided for projecting a laser show onto the second projection surface 3b and is classed in a higher laser class than 2M or 3A, another words the mean power density of the projection laser beam 5 relative to a 7 mm aperture is so high that the human eye can be damaged if the projection laser beam 7 strikes the retina. The rated radiant power of the projection laser beam 7 is preferably greater than 1 W.

As can be seen in FIG. 1, the apparatus also has an optical measuring device 15 to acquire a measured signal for the light from the working laser beam 5 that is reflected by the monitoring zone 3c. The measuring device 15 has an optical sensor, which is not shown in the drawing, and an optical system associated with the sensor for bundling the light from the working laser beam 5 that is reflected back from the monitoring zone 3c onto the sensor. The measuring device 15 is located at a distance from the first projection surface 3a, and its optical axis is pointed toward the first projection surface 3a.

A measured signal output from the measuring device 15 is connected to a first input of a comparison device 16. For the purpose of comparing the measured signal with a reference signal, a second input from the comparison device 16 is connected to a data storage device 17 in which the reference signal is stored. An output from the comparison device 16 is connected to a control input of a releasing device 18, to which the second laser 6 is connected.

The apparatus 1 may be controlled by a supervising computer 19. This computer is connected via an interface 20 to a control device 21 for the positioning device 11 and the releasing device 18. The control device 21 has a first graphical memory 22 and a second graphical memory 23. In the first graphical memory 22 graphical data for a first optical projection 2a that is to be projected onto the first projection surface 3a are stored; in the second graphical memory 23 graphical data for a second optical projection 2b that is to be projected onto the second projection surface 3b are stored.

The operation of the apparatus 1 is explained below. The apparatus 1 is first mounted, for example, on the ceiling of a hall or at some other suitable fixed position in then is brought to the desired position relative to the two projection surfaces 3a and 3b. The apparatus 1 is installed in such a way that no persons can normally be present in the area between the positioning device 11 and the first projection surface 3a during the operation of the apparatus 1. This can be accomplished, for example, by locating the apparatus 1 and the first projection surface 3a at a sufficient height above the floor of the hall. The positioning device is adjusted depending on the distance between the deflection mirrors 12a, 13b and the first projection surface 3a. The interface 20 is connected, for example, by means of a computer network to the computer 19, which can be assigned to a building controller.

Then the monitoring zone 3c is scanned with the aid of the working laser beam 5 by pointing the working laser beam 5 at the monitoring zone 3c and pivoting the deflection mirrors 13a, 13b in such a way that the point at which the working laser beam 5 strikes the film 8 moves along a polygonal path. The polygonal path may, for example, have a roughly zigzag shape, or it may have a meandering or circular shape. During the scanning operation a measured signal for the light from the working laser beam 5 reflected by the monitoring zone 3c is acquired with the aid of the measuring device 15 and is stored in the data storage device 17.

The device is now ready to operate, and the computer 19 can load the graphical information for a first optical projection 2a that is to be projected onto the first projection surface 3a via the interface 20 in the first graphical storage device 22. Before the first optical projection 2a is projected onto the first projection surface 3a with the aid of the projection laser beam 7, the monitoring zone 3c is scanned again using the working laser beam 5. The measured signal that is acquired for the light from the working laser beam 5 reflected by the monitoring zone 3c is compared with the aid of the comparison device 16 with the reference signal stored in the data storage device 17.

If an adequate correspondence is found in the comparison between the measured signal and the reference signal, the second laser 6 is turned on via the releasing device 18 and is projected onto the first projection surface 3a. The positioning device 11 is controlled depending on the graphical data located in the first graphical storage device 22. As positioning proceeds, the projection laser beam 7 moves along a polygonal path describing the first optical projection 2a. The rate of movement is preferably set in such a way that it cannot be detected by the human eye, which would make the polygonal movement visible as an optical line on the projection surface 3a. If needed, the projection laser beam 7 may be modulated in order to control the brightness of the projected laser spot.

If no adequate correspondence is found in the comparison between the measured signal and the reference signal, it is assumed that the position of the apparatus 1 has changed relative to the reference measurement for the film 8 and/or that an obstacle is located in the path of the beam between the positioning device 11 and the film 8. The second laser 6 is then disabled by the releasing device, for example by shutting off the second laser 6 and/or placing a light-blocking diaphragm (shutter) in the path of the projection laser beam 7.

The scanning of the first projection surface 3a by means of the working laser beam 5 and the comparison between the resultant measured signal and the reference signal is repeated cyclically at specified time intervals.

If the second laser 6 is not operating, the second optical projection 2b may be projected onto the second projection surface 3b by means of the first laser 4. In this case, the positioning device 11 is controlled depending on the graphical data located in the second graphical storage device 23.

With a apparatus 1 that is installed in an exhibition hall, the outer contours of areas in which exhibition booths are to be set up, for example, may be projected onto the floor of the hall with the aid of the first laser 4. Because of the low radiant power of the first laser 4, persons may safely be present in the area that is struck by the first laser beam 4, for example in order to install exhibition booths.

In the embodiment example shown in FIGS. 4 and 5 a plurality of devices 1 comprising at least the lasers 4, 6, the prism 10, the optical deflection system 12, the positioning device 11, the measuring device 15, the data storage device 17, the comparison device 16, the releasing device 18, the graphical storage devices 22, 23, and the interface 20 may be arranged in a row next to reach other, separated by spaces. The first projection surface 3a is formed by a film 8, that is] located below the devices 1, and that extends in the shape of an undulating line essentially in the horizontal direction. The film 8 is located at a distance separating it from the floor at a height that permits persons to pass beneath it without touching the film 8.

The film 8 is transparent to the projection laser beam 7. When it passes through the film 8, the projection laser beam 7 is scattered at the film 8 in such a way that the eyes of a person who is located on the floor beneath the film 8 cannot be damaged by the projection laser beam 7.

With the aid of the individual devices 1 a subarea of a first optical projection may be projected onto the film 8 in each case by means of the second laser 6. The subareas are selected in such a way that they are located next to reach other and that they can join together to form the first optical projection. With the aid of the first laser 4, a second optical projection can be projected onto a second projection surface that is spaced at a distance from the film 8 and is not shown in FIGS. 4 and 5.

The interfaces 20 of the individual devices 1 are connected to a central computer 19, which communicates the graphical information for the subareas of the optical projection to the graphical storage devices 22, 23 of the devices 5. Of course, a plurality of optical projections that are separated from each other may be projected onto the film 8 with the aid of the devices 1. The individual devices 1 may be controlled independently of each other and, if necessary, turned on and/or off individually.

It must be noted that the comparison device 16, the data storage device 17, the releasing device, and/or the control device 21 may be completely or partially integrated into a microcomputer that is controlled by an operating program.

The invention claimed is:

1. A method for projecting at least one first optical projection onto a first projection surface, in which a monitoring zone that surrounds said first projection surface is scanned with the aid of at least one working laser beam that is not hazardous to the human eye, such that the working laser beam, of which at least one must be present, is positioned at various scanning locations in the monitoring zone, and at least one measuring signal is acquired for the light from the working laser beam that is reflected by the scanning locations, and the measured signal, of which at least one must be present, is compared with at least one reference signal, and the first optical projection is projected depending on the results of said comparison by means of a projection laser beam that has a rated power greater than the working laser beam onto the first projection surface, and with the aid of a working laser beam, of which at least one must be present, at least one second optical projection is projected onto a second projection surface located outside of the monitoring zone;
   wherein the first projection surface is located inside a hall, and is positioned at a distance from the floor of the hall, and the second projection surface is located on the floor of the hall.

2. The method of claim 1, wherein the working laser beam and the projection laser beam are generated with the aid of different lasers.

3. The method of claim 1, wherein the working laser beam is generated by attenuating the projection laser beam.

4. The method of claim 1, wherein a projection object that has the first projection surface and a projection device that is provided for emitting the working laser beam are placed in a predetermined specified position relative to each other, the projection object is then scanned in the monitoring zone with the aid of the working laser beam at the scanning locations, at least one measured signal for the light from the working laser beam reflected by the scanning locations is acquired, and this measured signal is saved as the reference signal.

5. The method of claim 4, wherein the scanning of the projection object is carried out while the projection laser beam is being projected onto the projection surface.

6. The method of claim 1, wherein the working laser beam is deflected for positioning on the projection surfaces.

7. The method of claim 1, wherein the scanning locations are located on an area of the projection object that surrounds the first projection surface.

8. The method of claim 1, wherein the working laser beam and the projection laser beam are guided in the same track over the first projection surface, and the working laser beam moves in front of the projection laser beam.

9. The method of claim 1, wherein at least two first projection surfaces border on each other, a projection laser beam is generated for each of these projection surfaces, the first optical projection system extends over at least two of the first projection surfaces, the first optical projection system is divided into projection areas, each of which is disposed within a first projection surface, and the individual projection areas are each projected onto this surface with the projection laser beam that is assigned to the respective projection surface.

10. The method of claim 1, wherein the monitoring zone is divided into subzones, in each case one working laser beam is generated for each subzone, and the individual subzones in each case are scanned with the working laser beam that is assigned to it.

11. The method of claim 1, wherein the projection laser beam is deflected for positioning on the first projection surface.

* * * * *